United States Patent [19]

Kawai et al.

[11] Patent Number: 4,649,888
[45] Date of Patent: Mar. 17, 1987

[54] IGNITION CONTROL APPARATUS FOR INTERNAL COMBUSTION ENGINES

[75] Inventors: Motoshi Kawai, Anjo; Noboru Yamamoto, Kariya; Katuhisa Mase, Aichi; Takeshi Matsui, Toyohashi; Tomoatsu Mikino; Yoshiyuki Miyase, both of Okazaki; Ryoichi Okuda, Kariya, all of Japan; Koichi Suzumura, Palo Alto, Calif.

[73] Assignee: Nippondenso Co., Ltd., Kariya, Japan

[21] Appl. No.: 723,308

[22] Filed: Apr. 15, 1985

[30] Foreign Application Priority Data

Apr. 16, 1984 [JP] Japan ................................ 59-76390

[51] Int. Cl.⁴ ............................................. F02P 5/155
[52] U.S. Cl. ..................................... 123/609; 123/644
[58] Field of Search ................ 123/609, 610, 644, 427

[56] References Cited

U.S. PATENT DOCUMENTS 4,121,556 10/1978 Bigliani et al. .................. 123/644 X
4,153,032 5/1979 Chateau ............................... 123/610
4,174,696 11/1979 Jundt et al. .......................... 123/644
4,248,195 2/1981 Gorille ............................. 123/609 X
4,303,977 12/1981 Kobashi et al. ................. 123/609 X
4,362,144 12/1982 Yamaguchi et al. ................ 123/609
4,467,776 8/1984 Mezger et al. ...................... 123/609
4,519,038 5/1982 Matsui et al. ....................... 123/418

Primary Examiner—Tony M. Argenbright
Attorney, Agent, or Firm—Cushman, Darby & Cushman

[57] ABSTRACT

In an apparatus for controlling the energization time of an ignition coil of an internal combustion engine, a desired ignition timing is computed in accordance with a load and rotation speed of the engine and an energization starting time of the ignition coil is computed in accordance with the ignition timing. The energization starting time is retarded in accordance with the primary current through the ignition coil and the energization time of the ignition coil is reduced. The primary current flow through the ignition coil is interrupted at the ignition timing.

3 Claims, 14 Drawing Figures

FIG. I
PRIOR ART
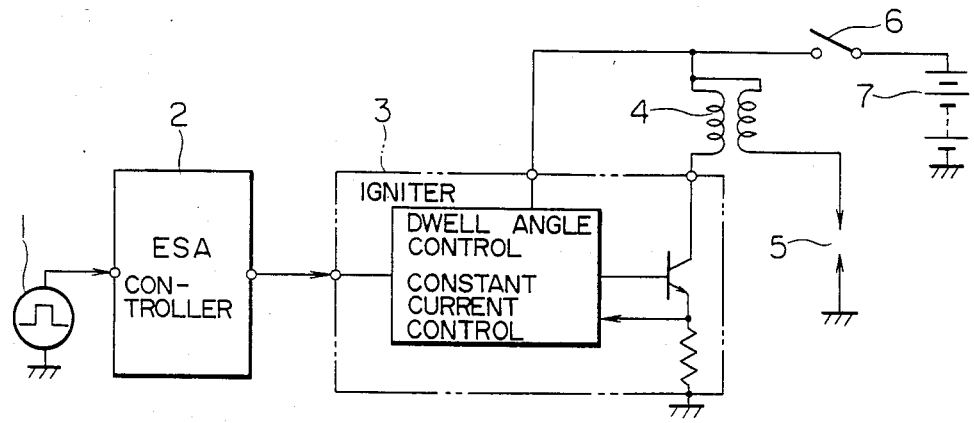
FIG. 2
PRIOR ART
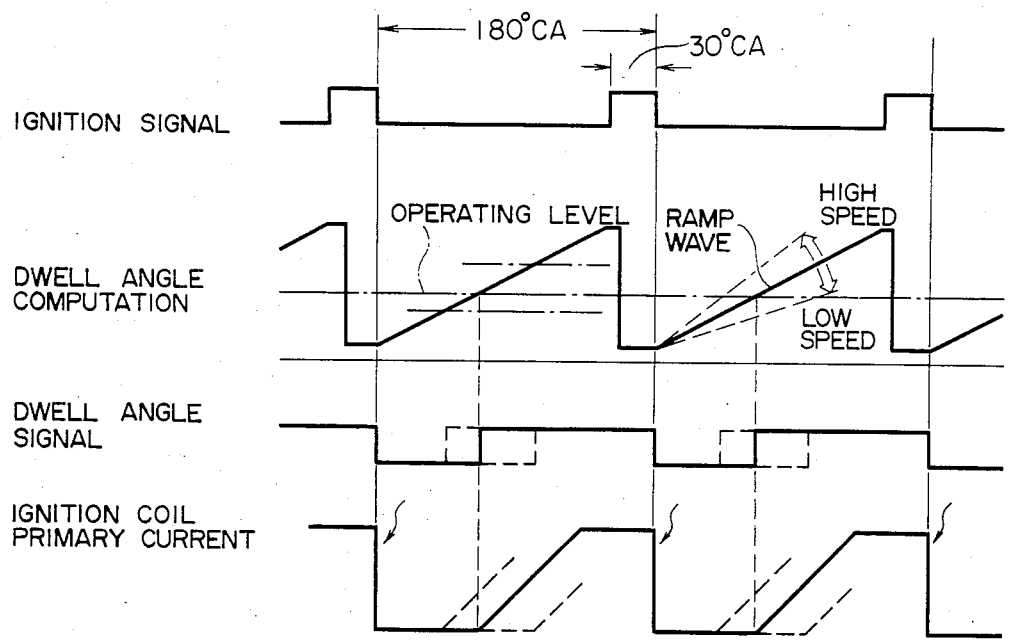

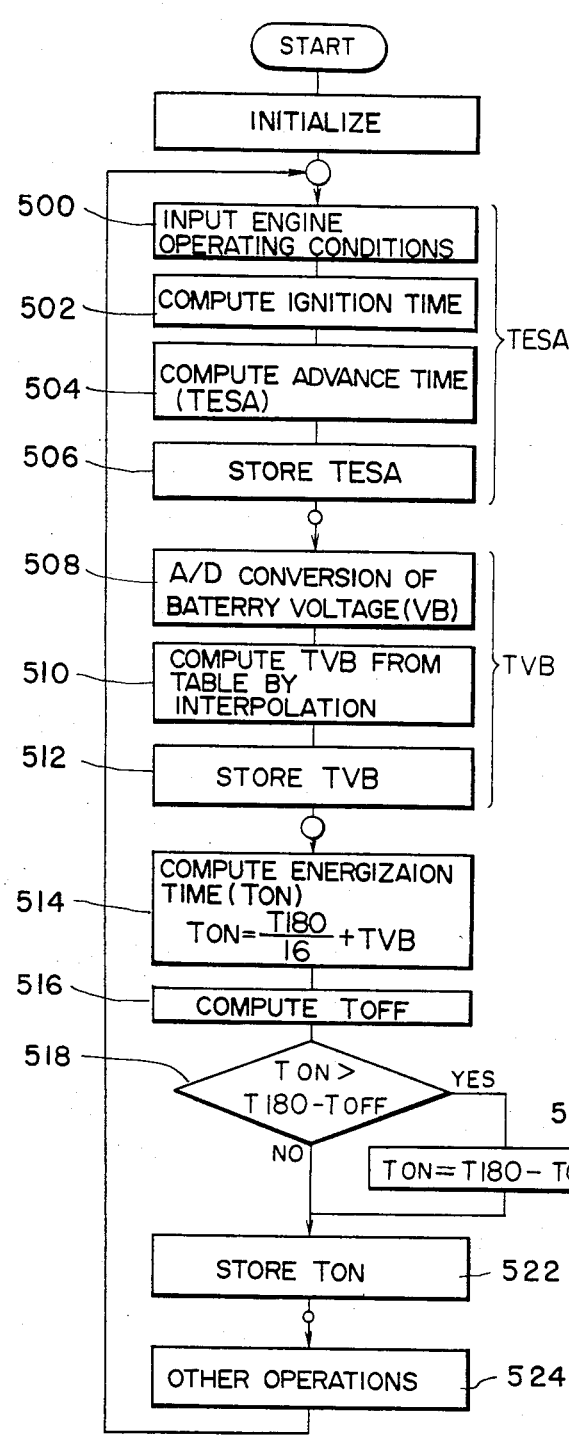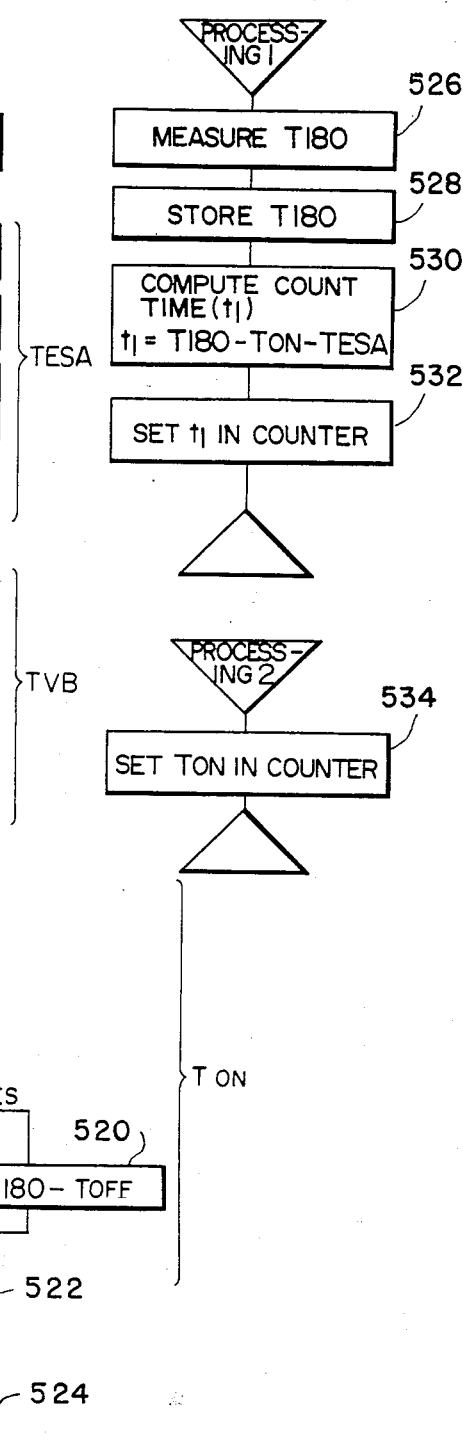
FIG. 5(a)
FIG. 5(b)

/ 1

IGNITION CONTROL APPARATUS FOR INTERNAL COMBUSTION ENGINES

BACKGROUND OF THE INVENTION

1. Field of the Invention

The present invention relates to an ignition control apparatus for an internal combustion engine which controls the length of time during which the primary current flows through the ignition coil.

2. Description of the Prior Art

An ignition coil dwell time control method for electronic spark advance systems of the type employing a microcomputer has been known in the art in which the desired dwell times as a function of the supply voltage and the engine speed are preliminarily stored in the form of a computing procedure or a map in the memory of the microcomputer, and a dwell time is determined by referring to it as occasion demands. Also, an ignition timing generating circuit including a microcomputer, counters, etc., has been known in the art in which a signal corresponding to a predetermined engine rotational angle and having a trailing edge indicative of an ignition timing is generated and an ignition coil dwell time is determined in accordance with the signal by a separate analog circuit.

In the case of the former method, the dwell times are predetermined, so that it is impossible to ensure the optimum dwell time due to the variations in coil performance caused during the manufacture, the coil temperature rise or the variations in spark plug discharge characteristics. Thus it is impossible to ensure satisfactory ignition performance. In the case of a circuit having a constant current control function for controlling the ignition coil primary current so as to prevent it from exceeding a predetermined value, if the duration of time that the constant current is reached is increased even slightly, the generation of heat by the circuit elements is increased rapidly, and this leads to breakdown of the elements in the worst case scenario.

While the latter method is free of the problems encountered by the former method, it requires a complicated circuit for controlling the dwell time and this increases the cost.

SUMMARY OF THE INVENTION

The present invention has been made in view of the foregoing deficiencies in the prior art, and it is the primary object of the invention to provide an ignition control apparatus for internal combustion engines in which an approximate ignition coil primary energization time is computed by an ESA control circuit for determining an ignition timing and the energization time is corrected to a reduced value by an igniter thereby obtaining the optimum energization time.

BRIEF DESCRIPTION OF THE DRAWINGS

FIG. 1 is a schematic diagram showing the construction of a conventional ignition control apparatus for internal combustion engines.

FIG. 2 shows a plurality of signal waveforms generated in the principal portions of the apparatus shown in FIG. 1.

FIGS. 5(a) and 5(b) are flow charts respectively showing a main routine and an interrupt routine for the ignition and energization control of the invention.

DESCRIPTION OF THE PREFERRED EMBODIMENTS

Referring first to FIG. 1, there is illustrated a block diagram of an ignition apparatus according to a conventional system. FIG. 2 shows a plurality of principal waveforms showing the operation of the apparatus of FIG. 1. An ESA control circuit 2 is responsive to a reference position signal generator 1 to compute an ignition timing in accordance with the engine operating conditions and apply an ignition signal having a 30° crank-angle width to an igniter 3. In response to the ignition signal, the igniter 3 performs a dwell angle control and determines a primary current flow starting time for an ignition coil 4. In accordance with the dwell angle control method of this system, the igniter 3 generates a ramp wave in response to the trailing edge of the ignition signal or the ignition timing. The current flow is started at a time at which the ramp wave reaches an operating level. Here, the slope of the ramp wave is varied so that the slope is made sharper as the engine speed is increased. Also, the operating level is increased as the engine speed is decreased and the operating level is increased as the engine speed is decreased, thereby ensuring substantially a constant current flow time. Then, the interval of time that the coil primary current is greater than a predetermined value (this is referred to as a constant current time) is detected and a control is performed so that the operating level is increased with an increase in the constant current time thereby always ensuring the optimum dwell angle. Thus, there is the disadvantage of requiring a very complicated circuit construction for varying the slope of the ramp wave and the operating level so as to effect the control over a wide range of low to high engine speeds. Numeral 5 designates a spark plug, 6 an ignition switch and 7 a battery.

An ignition control apparatus for internal combustion engines according to the invention will now be described with reference to the accompanying drawings.

Figure 3:
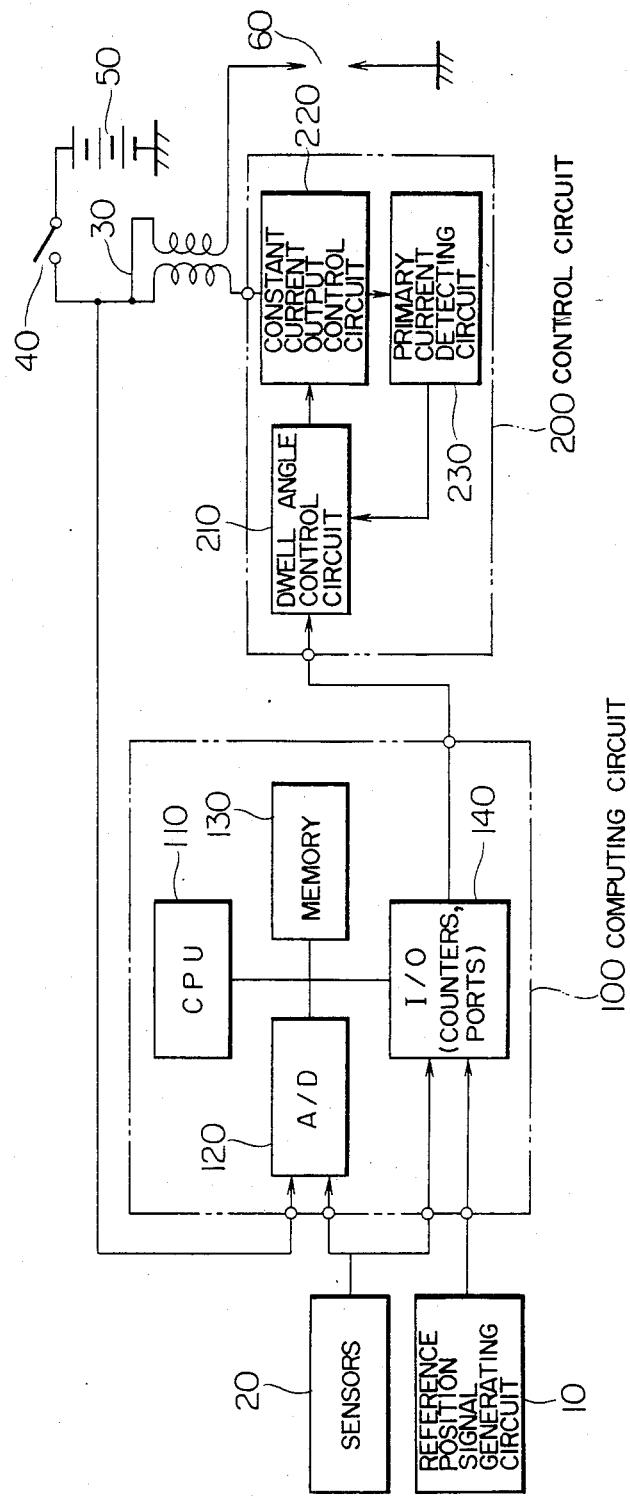
FIG. 3 is a block diagram showing the construction of an ignition control circuit apparatus for internal combustion engines according to the invention.

FIG. 3 is a block diagram showing the construction of the ignition control apparatus according to the invention. Numeral 10 designates a reference position signal generating circuit for generating a reference position signal in synchronism with the rotation of an engine. Numeral 20 designates various sensors for sensing the operating conditions of the engine. Numeral 100 designates a computing circuit which receives the operating conditions of the engine, e.g., the load and the speed to compute a desired ignition timing, computes an ignition coil energization starting time which is a predetermined time before the ignition timing and generates a signal indicative of the energization starting time and the ignition timing in accordance with the reference position signal from the signal generating circuit 10. The computing circuit 100 includes a CPU 110, an A/D converter 120, a memory 130 and an input/output unit 140 including input/output ports and counters.

Numeral 200 designates a control circuit for receiving the output signal of the computing circuit 100 so that the energization starting time indicated by the output signal is retarded to always ensure the optimum ignition performance and the energization time computed by the computer circuit 100 is reduced and corrected. The control circuit 200 includes a dwell angle control circuit 210 for computing a reduced energization time, a constant current output control circuit 220 for controlling the flow of the primary current through the ignition coil 30 and controlling the primary current to prevent it from exceeding a predetermined value and a primary current detecting circuit 230 for detecting the primary current in the ignition coil 30 to generate a signal corresponding to the primary current. The ignition coil 30 has a varying the current in the primary winding so that a high voltage is induced in the secondary winding and an ignition spark is produced at a spark plug 60. An ignition switch 40 controls the current flow from a battery 50.

Figure 4:
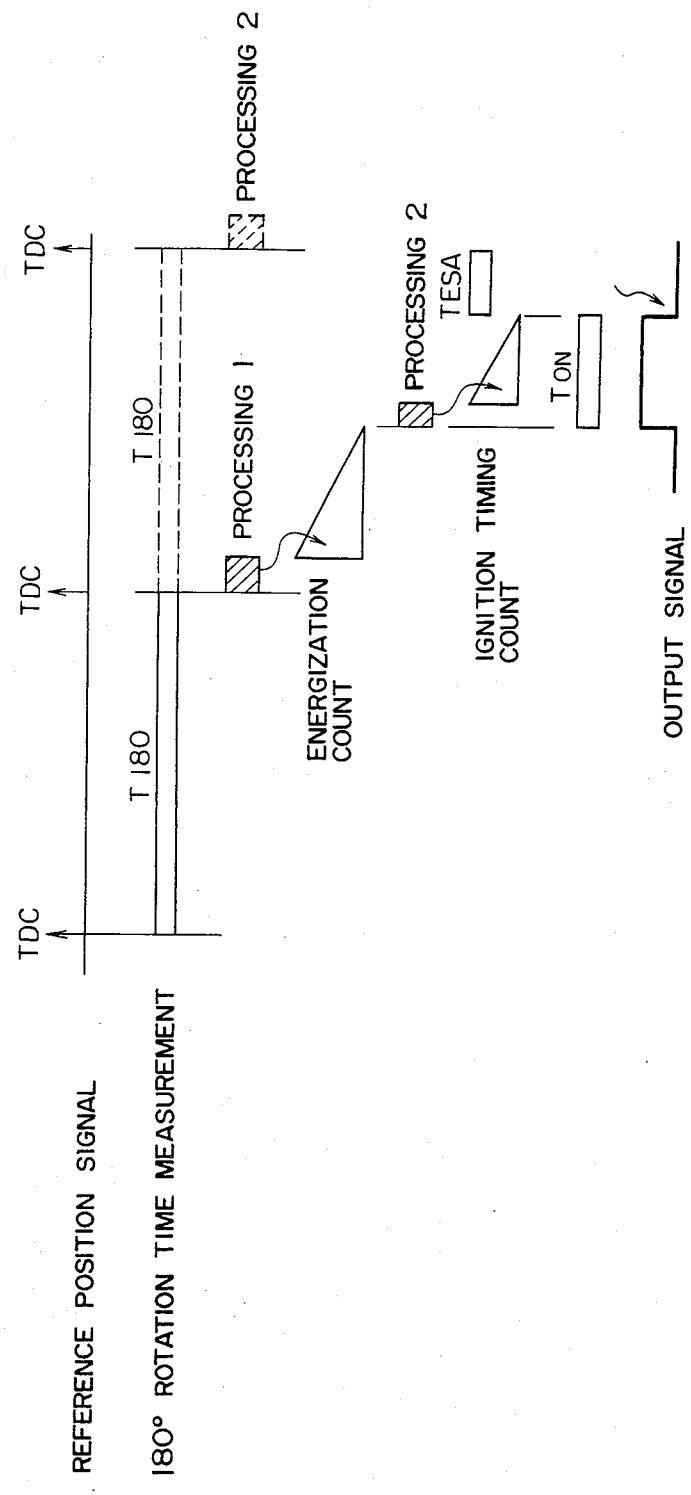
FIG. 4 shows the detailed manner in which an ignition output signal is generated in accordance with a reference position signal in the apparatus of the invention.
Figure 6:
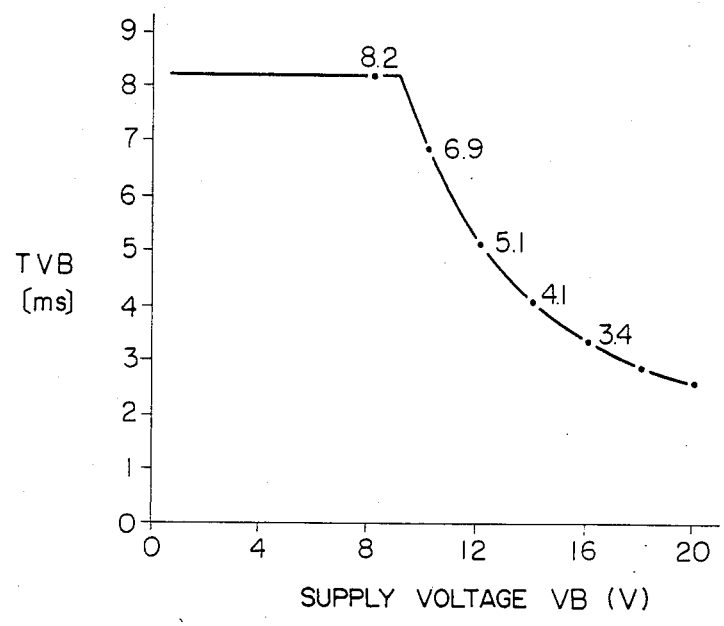
FIG. 6 is a diagram showing the relation between $T_{VB}$ and $V_B$.

FIG. 4 shows in a timed sequence the computational operations performed by the computing circuit 100, and FIGS. 5(a) and 5(b) are flow charts showing the flows of the computational operations of FIG. 4. FIG. 5(a) shows a main routine and FIG. 5(b) shows an interrupt routine. The main routine performs those operations which must be synchronized with the engine rotation in lesser degrees, while the interrupt routine is executed in synchronism with the engine rotation and it is performed as an interrupt processing which interrupts the main routine while it is being executed. In accordance with the main routine, after the program has been started, the initialization of various component parts is effected at step 500 and then the operating conditions of the engine are inputted from the sensor group 20 at step 502. In accordance with the engine operating conditions and a time $T_{180}$ required for the engine crankshaft to rotate through 180 degrees and determined by the interrupt routine, the desired advance time $T_{ESA}$ is obtained from the data table stored in the memory 130 by table interpolation at step 504 and it is then stored in the memory 130 at step 506. Here, the advance time is an advance time from TDC to the ignition timing and it represents the amount of advance (angle) computed in terms of time. Then, the battery voltage $V_B$ is inputted through the A/D converter 120 at step 508 and the value of $T_{VB}$ is computed at step 510. FIG. 6 shows an example of the relation between $T_{VB}$ and $V_B$ and the value of $T_{VB}$ is represented as a function of the supply voltage $V_B$. In the actual processing, the desired value of $T_{VB}$ is computed in accordance with the supply voltage $V_B$ by interpolating the $T_{VB}$ table stored in the memory 130 which is then stored in the memory 130 at step 512. Then, in accordance with the values of $T_{180}$ and $T_{VB}$, the desired flow time $T_{ON}$ of the primary current through the ignition coil 30 is computed from the following equation as shown in step 514

$$T_{ON} = \frac{T_{180}}{16} + T_{VB}$$

Figure 7:
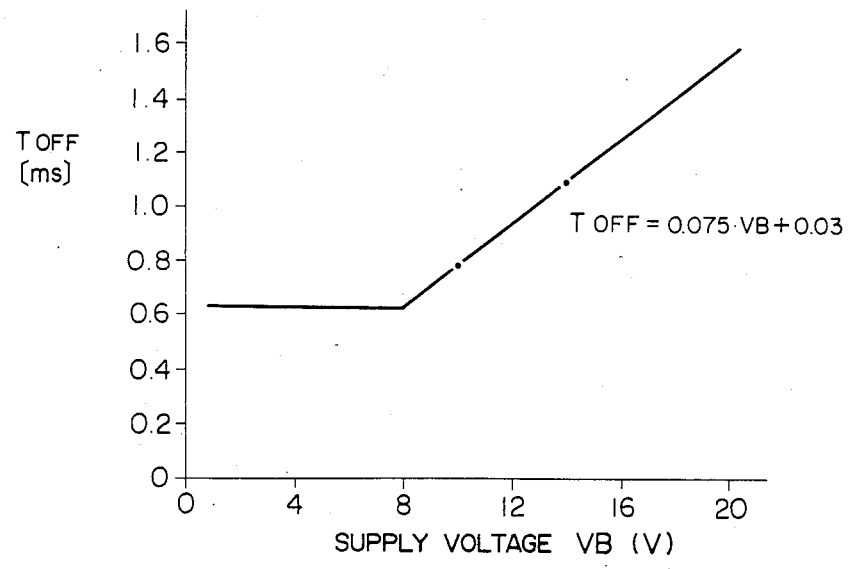
FIG. 7 is a diagram showing the relation between $T_{off}$ and $V_B$.

Then, an off time $T_{off}$ of the primary current through the ignition coil 30 is computed at step 516. The off time $T_{off}$ is computed in accordance with the supply voltage $V_B$ as shown in FIG. 7. The off time $T_{off}$ is compared with the flow time $T_{ON}$ at step 518, so that if the flow time $T_{ON}$ is so long that the off time is not ensured, the flow time $T_{ON}$ is reduced at step 520 and stored as the new flow time $T_{ON}$ in the memory 130 at step 522. Then, other operations are performed step 524 and thereafter this loop is performed repeatedly.

The interrupt routine will now be described. A processing 1 is performed immediately after TDC or the reference position signal 1, so that after the time $T_{180}$ required for a 180° engine crankshaft rotation has been measured by using the counter of the I/O unit 140 at step 526 and stored in the memory 130 at step 528, an energization count time $t_1$ is computed from the following equation at step 530 and supplied to the counter of the I/O unit 140 at step 532.

$$t_1 = T_{180} - T_{ON} - T_{ESA}$$

Here, the values computed by the main routine and stored in the memory 130 are used for $T_{ON}$ and $T_{ESA}$. Then, after the given energization count has been reached, an energization starting output signal is generated, immediately after which the interrupt processing routine of a processing 2 is performed so that the count $T_{ON}$ is loaded into the ignition timing counter at step 534 and an ignition timing is computed from the count $T_{ON}$ thereby generating a ignition timing output signal at the ignition timing.

Figure 8:
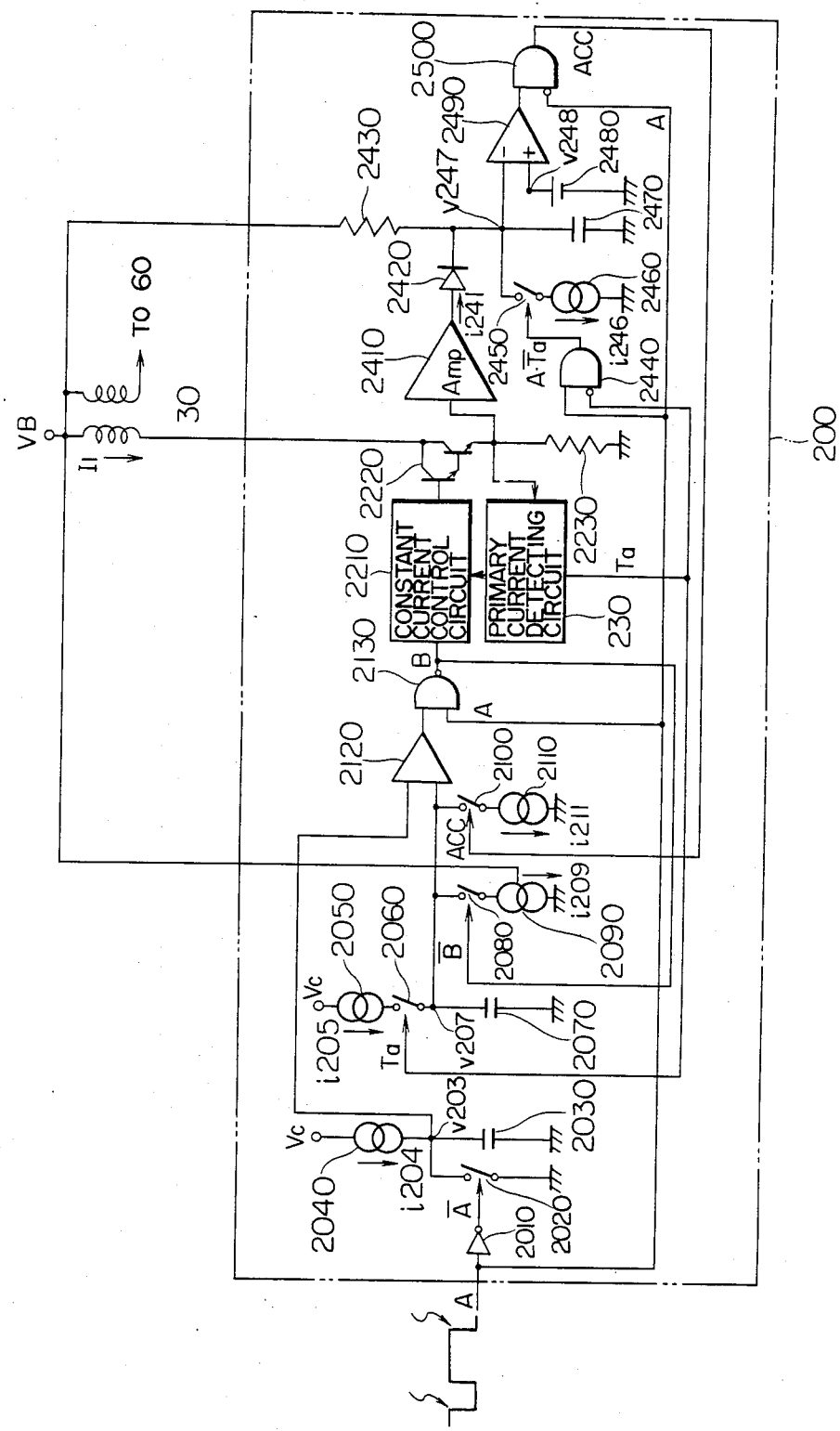
FIG. 8 is a circuit diagram of the control circuit in the apparatus of the invention.

FIG. 8 shows an electric circuit diagram of the control circuit 200 and particularly a detailed circuit diagram of the dwell angle control circuit 210. The input signal to the control circuit 200 indicates the ignition timing by its pulse trailing edge. Numeral 2040 designates a constant current source for charging a capacitor 2030, and 2010 an inverter for controlling a switch 2020 to discharge the capacitor 2030. Numeral 2050 designates a constant current source, 2060 a switch, 2070 a capacitor, and 2080 a switch. Numeral 2090 designates a constant current source whose current value is controlled in accordance with the supply voltage $V_B$. Numeral 2100 designates a switch, 2110 a constant current source, 2120 a comparator for comparing the potentials of the capacitors 2030 and 2070, 2130 a NAND gate, 2210 a constant current control circuit for turning on a power transistor 2220 to prevent the primary current through the ignition coil 30 from exceeding a predetermined current value, and 230 the primary current detecting circuit for detecting the primary current through the ignition coil 30 from the potential across a current detecting resistor 2230.

The part of the dwell angle control circuit 200 relating to the detection of acceleration will now be described. Numeral 2410 designates an amplifier for amplifying the voltage across the resistor 2230 to generate a voltage waveform similar to the primary current waveform of the ignition coil 30 across a capacitor 2470 through a diode 2420. Numeral 2440 designates an AND gate having an inverter at one of its two inputs. Numeral 2450 designates a switch, 2460 a constant current source, 2430 a resistor forming, along with the capacitor 2470, a CR time constant circuit, 2480 a reference voltage for a comparator 2490, and 2500 a gate for generating an acceleration pulse ACC.

Figure 9:
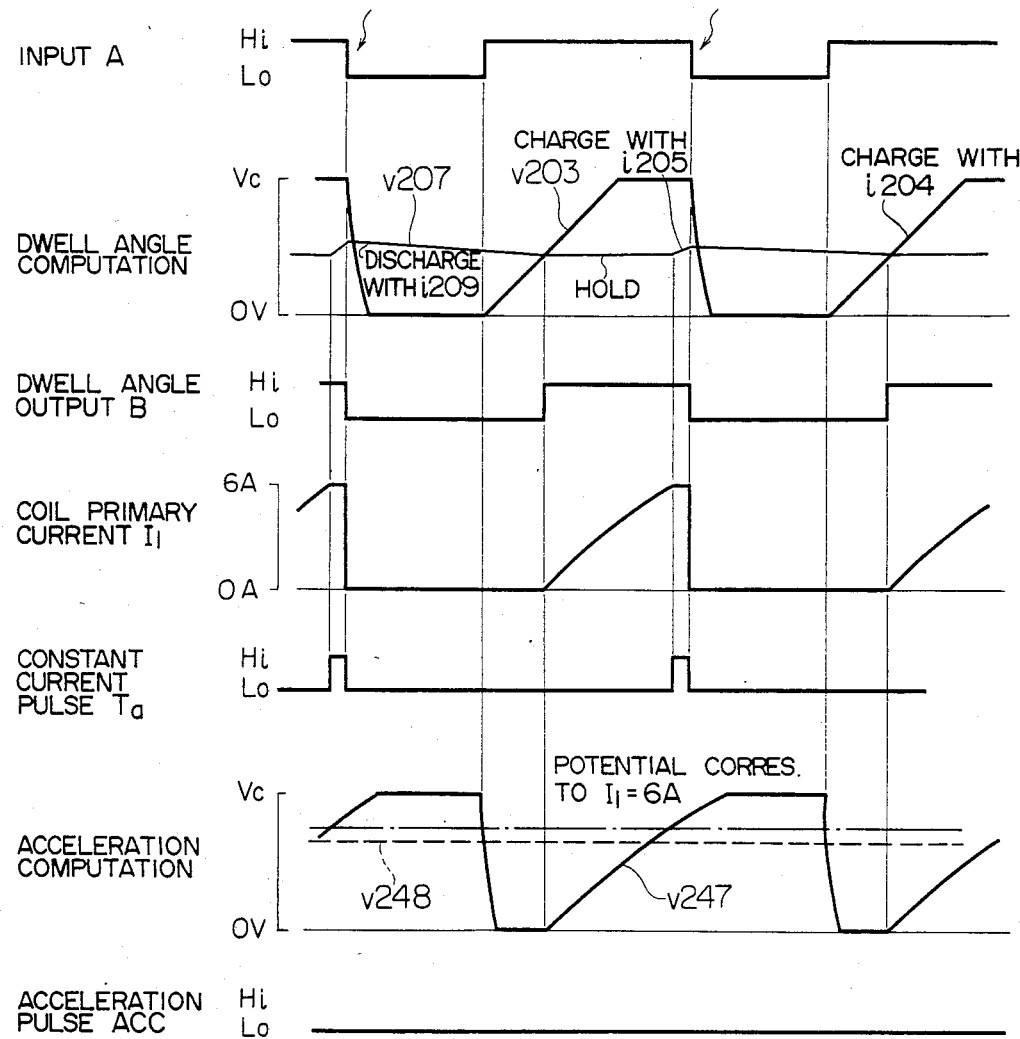
FIG. 9 shows a plurality of signal waveforms generated in the principal portions of the apparatus of the invention.

FIG. 9 shows a plurality of waveforms generated at various points in the control circuit 200. The input signal A which is the output of the computing circuit 100 determines an approximate energization time and its leading and trailing edges respectively represent the times of energization and ignition. The switch 2020 is turned on during the duration of an inverted input signal $\overline{A}$ so that the terminal voltage v203 of the capacitor 2030 becomes a ramp wave which rises in response to the leading edge of the input signal A and it is reset by the inverted input signal $\overline{A}$. The capacitor 2070 is charged by the current i205 from the constant current source 2050 during a constant current time. On the other hand, during the duration of an inverted dwell angle output $\overline{B}$ during which there is no primary current flow through the ignition coil 30, the capacitor 2070 is discharged by the current i209 of the constant current source 2090, and is discharged by the current i211 of the constant current source 2110 during the time that an acceleration pulse is generated. The terminal voltage v207 of the capacitor 2070 is compared with the terminal voltage v203 by the comparator 2120 so that the primary winding of the ignition coil 30 is energized when the terminal voltage v203 becomes higher than the terminal voltage v207. The NAND circuit 2130 performs its logical operation on the output of the comparator 2120 and the input signal A and the resulting output becomes the inverted dwell angle output signal $\overline{B}$ which controls the energization of the primary winding of the ignition coil 30 and the ignition timing. A coil primary current $I_1$ is a current that flows through the primary winding of the ignition coil 30, and a constant current pulse Ta is a signal which is generated from the current detecting circuit 230 during the time that the primary current $I_1$ is greater than a predetermined value.

Figure 11:
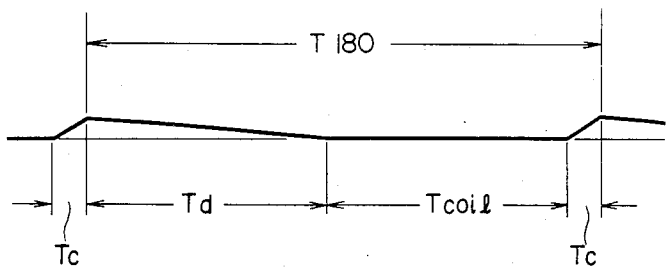
FIG. 11 is a signal waveform diagram for explaining the manner in which the constant current time is controlled to the predetermined value.
Figure 10A:
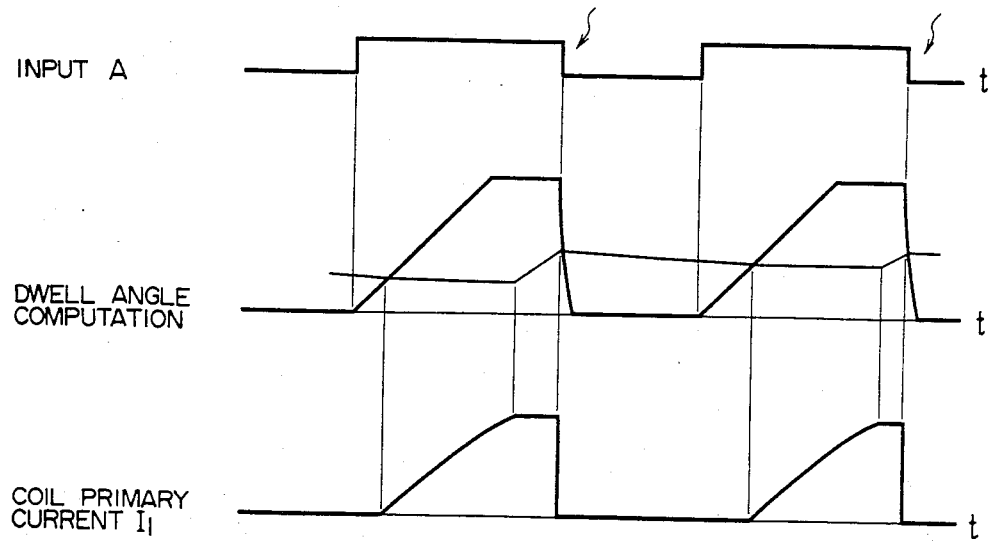
FIGS. 10(a) and 10(b) are signal waveform diagrams showing the manners in which a constant current time is controlled to a predetermined value by a dwell angle computation.
Figure 10B:
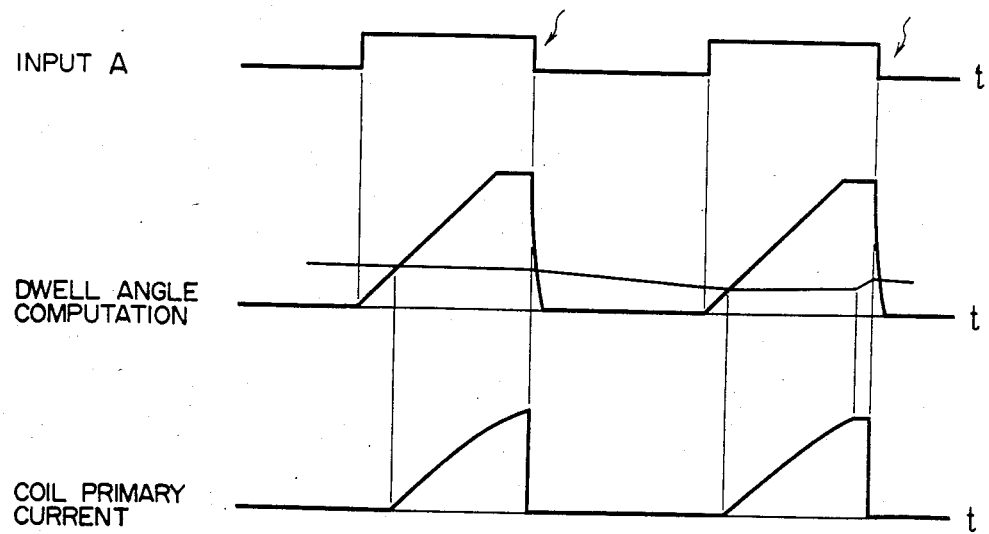

FIGS. 10(a) and 10(b) show the manner in which the constant current time is controlled to a predetermined value by a dwell angle computation and FIG. 10(a) shows the manner in which the next energization starting time is retarded when the preceding constant current time is long. Also, FIG. 10(b) shows the manner in which the next energization starting time is advanced when the preceding constant time is short. In this way, the constant current time is controlled so that it always becomes equal to the predetermined value and its value is determined by the waveform shown in Fig. 11. In other words, the capacitor 2070 is charged with the constant current i205 during the period of a constant current time Tc and it is discharged with the constant current i209 during the period of Td. Thus, the following equation holds $$\frac{i205 \times Tc}{c207} = \frac{i209 \times (T_{180} - Tc - Tcoil)}{c207}$$

$$Tc = \frac{i209}{i205 + i207}(T_{180} - Tcoil)$$

Here, Tco is the coil rise time and c207 is the capacitance of the capacitor 2070.

Figure 12:
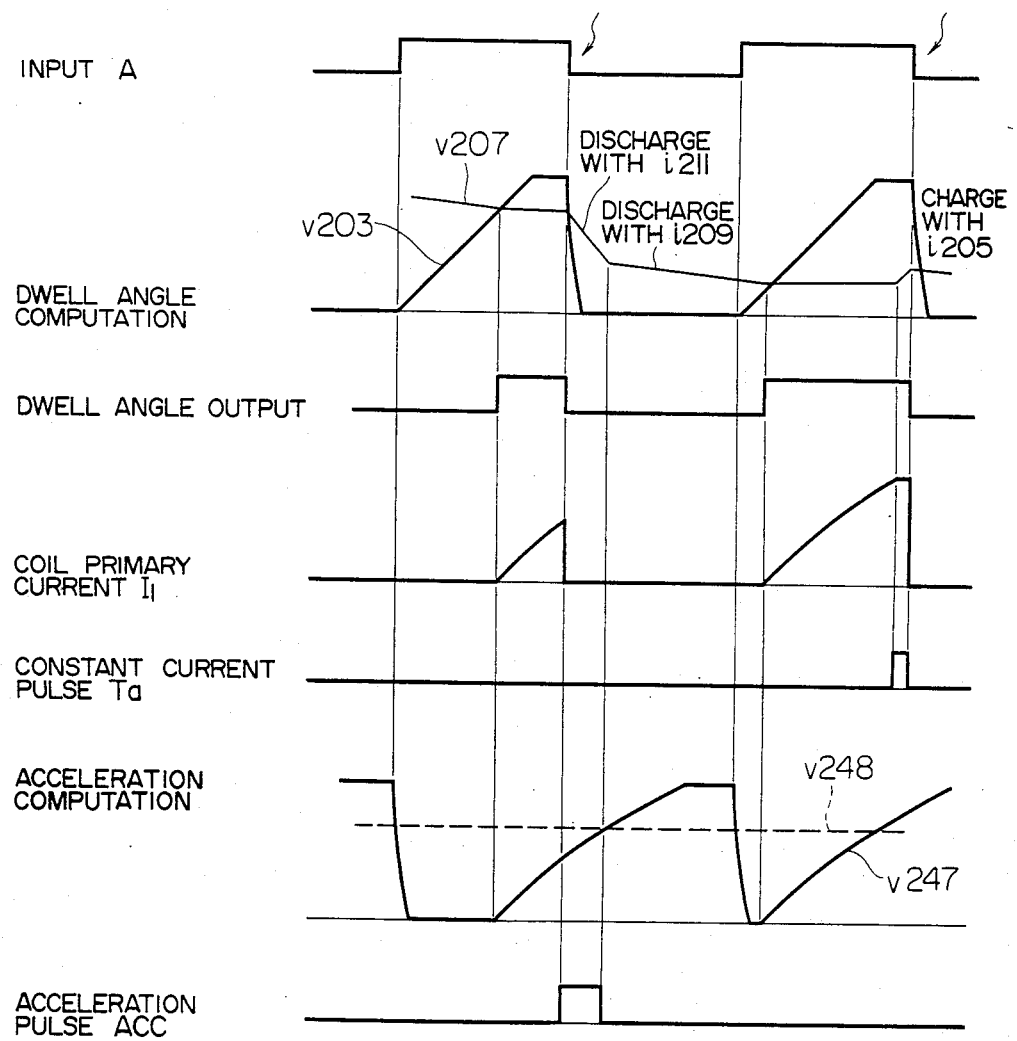
FIG. 12 is a diagram showing the detection of an acceleration and the correction of a dwell angle during the acceleration.

FIG. 12 shows the detection of acceleration and the correction of the dwell angle during the acceleration. The capacitor 2470 is charged with the output current i241 of the amplifier 2410 to generate a voltage similar to the current waveform of the coil primary current $I_1$ and it is then charged through the resistor 2430. Then, the voltage is reset by a signal (A.Ta). There the dwell angle is small and thus the primary current $I_1$ is insufficient as shown in FIG. 12, an acceleration pulse ACC is generated until the terminal voltage v247 is increased to v248 after the ignition and the capacitor 2070 is rapidly discharged with the current i211 during the duration of the acceleration pulse ACC. As a result, the current i207 is rapidly decreased and the next energization starting time is advanced. The value of the resistor 2430 is selected so that it follows, along with the capacitor 2470, the rise characteristic of the ignition coil 30. Also, the voltage v248 is selected slightly lower than a potential corresponding to the constant current value of the primary current $I_1$ in consideration of variations of the circuit elements.

In accordance with an internal combustion engine ignition control apparatus of this invention, by virtue of its construction including a computing circuit for generating an ignition coil energization starting time signal and an ignition timing signal in accordance with the load and speed of an engine and a control circuit responsive to the said signals to retard the energization starting time and interrupt the ignition coil primary current, the desired energization time control of the ignition coil can be accomplished accurately, reliably and inexpensively.

We claim:

1. an ignition control apparatus for an internal combustion engine which controls the energization time of an ignition coil in accordance with a rotation speed of the engine, said apparatus comprising:
   reference position signal generating means for generating a reference position signal synchronized with a rotation of said engine;
   computing means for: (1) computing a desired ignition timing in accordance with a magnitude of a load on said engine and a rotation speed of said engine, (2) computing, in accordance with said ignition timing, an energization starting time for said ignition coil, which energization starting time precedes said ignition timing by a predetermined time and (3) generating a signal indicative of said energization starting time and said ignition timing synchronized with said reference position signal; and
   control means including: (1) primary current detecting means for detecting when a primary current of said ignition coil exceeds a predetermined value and producing a primary current detecting signal indicative thereof, (2) a first integrating means including a first integrating element for initiating an integration in one direction in said first integrating element in synchronization with said energization starting time signal of said computing means and for resetting an integration value of said first integrating element to an initial value in synchronization with said ignition timing signal of said computing means, (3) second integrating means, including a second integrating element, for performing an integration on said second integrating element in a first direction while said primary current detecting signal indicates that the primary current of said ignition coil exceeds said predetermined value, and in a second direction opposite from said first direction in synchronization with and in response to the ignition time signal of said computing means, (4) energization starting signal generating means for detecting when said integration value of said first integrating element becomes larger than an integration value of said second integrating element and generating an energization starting signal in response to such detection and (5) integration interrupting means for interrupting the integration in the second direction of said second integrating element during a time interval during which said primary current is flowing through said ignition coil;

an integration time constant of each of said first and second integration means being determined so that said second integrating element has a first integration value, which is a value at the time of integration initiation in said first direction, and a second integration value, which is a value at the time of integration interruption in said second direction, which first and second integration values are identical when the time interval during which the primary current of said ignition coil exceeds the predetermined value corresponds to an optimum value, which optimum value is started by the energization starting signal produced from said energization starting signal generating means and is stopped by the ignition timing signal produced from said computing means.

2. An apparatus according to claim 1, wherein said computing means includes detecting means for detecting a supply voltage supplied to the primary winding of said ignition coil and an engine rotation speed whereby said energization starting time of said ignition coil preceding said ignition timing by said predetermined time determined by the following equation is computed in accordance with said supply voltage and a time required for a predetermined angle of rotation of said engine $$T_{ON} = \frac{T_{180}}{k} + T_{VB}$$

where $T_{ON}$ is the energization time, $T_{180}$ is a time required for 180 degrees crankshaft rotation of the engine, $k$ is a constant, and $T_{VB}$ is a time determined by the ignition coil used and the supply voltage.

3. An ignition control apparatus according to claim 1 further comprising:

third integrating means, including a third integrating element, for integrating a simulation of said primary current during the time interval when said primary current is flowing through said ignition coil, and for resetting to an initial value in synchronization with the energization starting signal produced from said computing means;

simulated primary current detecting means for producing an output signal during a time beginning when the integration is initiated and ending at a time when the integration value of said third integrating means reaches a value corresponding to a primary current value which is relatively smaller than a primary current detection value detected by said primary current detecting means;

acceleration pulse generating means for producing an acceleration pulse during a time beginning when said ignition timing signal is produced and ending at a time when said simulated primary current detecting means produces the output signal when said computing means produces the ignition timing signal and said simulated primary current detecting means produces the output signal; and accelerating integration correction means for increasing a slope of the integration in said second direction of said second integrating means during the time interval when said acceleration pulse generating circuit is producing the acceleration pulse.

* * * * *